(12) United States Patent
Hum et al.

(10) Patent No.: US 9,170,946 B2
(45) Date of Patent: Oct. 27, 2015

(54) DIRECTORY CACHE SUPPORTING NON-ATOMIC INPUT/OUTPUT OPERATIONS

(71) Applicants: Herbert H. Hum, Portland, OR (US); James R. Vash, Littleton, MA (US); Eric A. Gouldey, Fort Collins, CO (US); Ganesh Kumar, Fort Collins, CO (US); David Bubien, Fort Collins, CO (US); Manoj K. Arora, Bangalore (IN); Luke Chang, Aloha, OR (US); Lavanya Nama, Warangal (IN); Mahak Gupta, Bangalore (IN)

(72) Inventors: Herbert H. Hum, Portland, OR (US); James R. Vash, Littleton, MA (US); Eric A. Gouldey, Fort Collins, CO (US); Ganesh Kumar, Fort Collins, CO (US); David Bubien, Fort Collins, CO (US); Manoj K. Arora, Bangalore (IN); Luke Chang, Aloha, OR (US); Lavanya Nama, Warangal (IN); Mahak Gupta, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 384 days.

(21) Appl. No.: 13/724,214

(22) Filed: Dec. 21, 2012

(65) Prior Publication Data

US 2014/0181394 A1    Jun. 26, 2014

(51) Int. Cl.
*G06F 12/08* (2006.01)

(52) U.S. Cl.
CPC .......... *G06F 12/082* (2013.01); *G06F 12/0824* (2013.01); *G06F 12/0833* (2013.01); *G06F 12/0835* (2013.01); *G06F 2212/1016* (2013.01); *G06F 2212/621* (2013.01)

(58) Field of Classification Search
CPC .............. G06F 12/082; G06F 12/0815; G06F 12/0824; G06F 12/0817; G06F 12/0831; G06F 12/0833; G06F 12/0835; G06F 2212/1016; G06F 2212/1024; G06F 2212/62; G06F 2212/621
See application file for complete search history.

(56) References Cited

U.S. PATENT DOCUMENTS

| | | | |
|---|---|---|---|
| 2002/0053004 A1* | 5/2002 | Pong | 711/119 |
| 2004/0123045 A1* | 6/2004 | Hum et al. | 711/141 |
| 2007/0079072 A1* | 4/2007 | Collier et al. | 711/133 |
| 2007/0079075 A1* | 4/2007 | Collier et al. | 711/141 |
| 2007/0150664 A1* | 6/2007 | Dombrowski et al. | 711/144 |
| 2009/0006668 A1* | 1/2009 | Vasudevan et al. | 710/33 |
| 2012/0131282 A1* | 5/2012 | Sun et al. | 711/141 |

FOREIGN PATENT DOCUMENTS

WO    WO 2007041392 A2 *    4/2007    .............. G06F 12/08

* cited by examiner

*Primary Examiner* — Michael Krofcheck
(74) *Attorney, Agent, or Firm* — Lowenstein Sandler LLP

(57) ABSTRACT

Responsive to receiving a write request for a cache line from an input/output device, a caching agent of a first processor determines that the cache line is managed by a home agent of a second processor. The caching agent sends an ownership request for the cache line to the second processor. A home agent of the second processor receives the ownership request, generates an entry in a directory cache for the cache line, the entry identifying the remote caching agent as having ownership of the cache line, and grants ownership of the cache line to the remote caching agent. Responsive to receiving the grant of ownership for the cache line from the home agent an input/output controller of the first processor adds an entry for the cache line to an input/output write cache, the entry comprising a first indicator that the cache line is managed by the home agent of the second processor.

16 Claims, 7 Drawing Sheets

DIRECTORY CACHE SUPPORTING NON-ATOMIC INPUT/OUTPUT OPERATIONS

FIELD

The present disclosure pertains to the field of processing logic, microprocessors, and associated instruction set architecture that, when executed by the processor or other processing logic, perform logical, mathematical, or other functional operations.

BACKGROUND

In modern computer systems, it is common to have multiple processors both in the way of multiple cores of a multi-core processor, and in the way of multiple processor sockets, each potentially including multiple cores. In addition, other system components such as various semiconductor devices, e.g., I/O devices, controllers, chipsets and so forth are also present in a typical system. To enable the various components to interact with efficiency and commonality of data, many systems incorporate some type of cache coherency protocol. That is, many systems have a protocol in place to allow multiple copies of a given datum to be present in various locations of a system such as a system memory as well as one or more caches that can be associated with different components of the system.

Different cache coherency protocols exist. One common protocol implements a directory that is typically stored in system memory. This directory maintains information regarding the location and status of data present in the various caches or other structures of the system. To maintain coherency of the data and allow for accurate updating of state information, various communications occur according to this cache coherency protocol.

Because the directory is typically stored in memory, memory bandwidth is consumed by such cache coherency communications. This memory bandwidth consumption can negatively impact application performance, particularly m a multiprocessor system where data is shared by multiple components.

DETAILED DESCRIPTION

Figure 1:
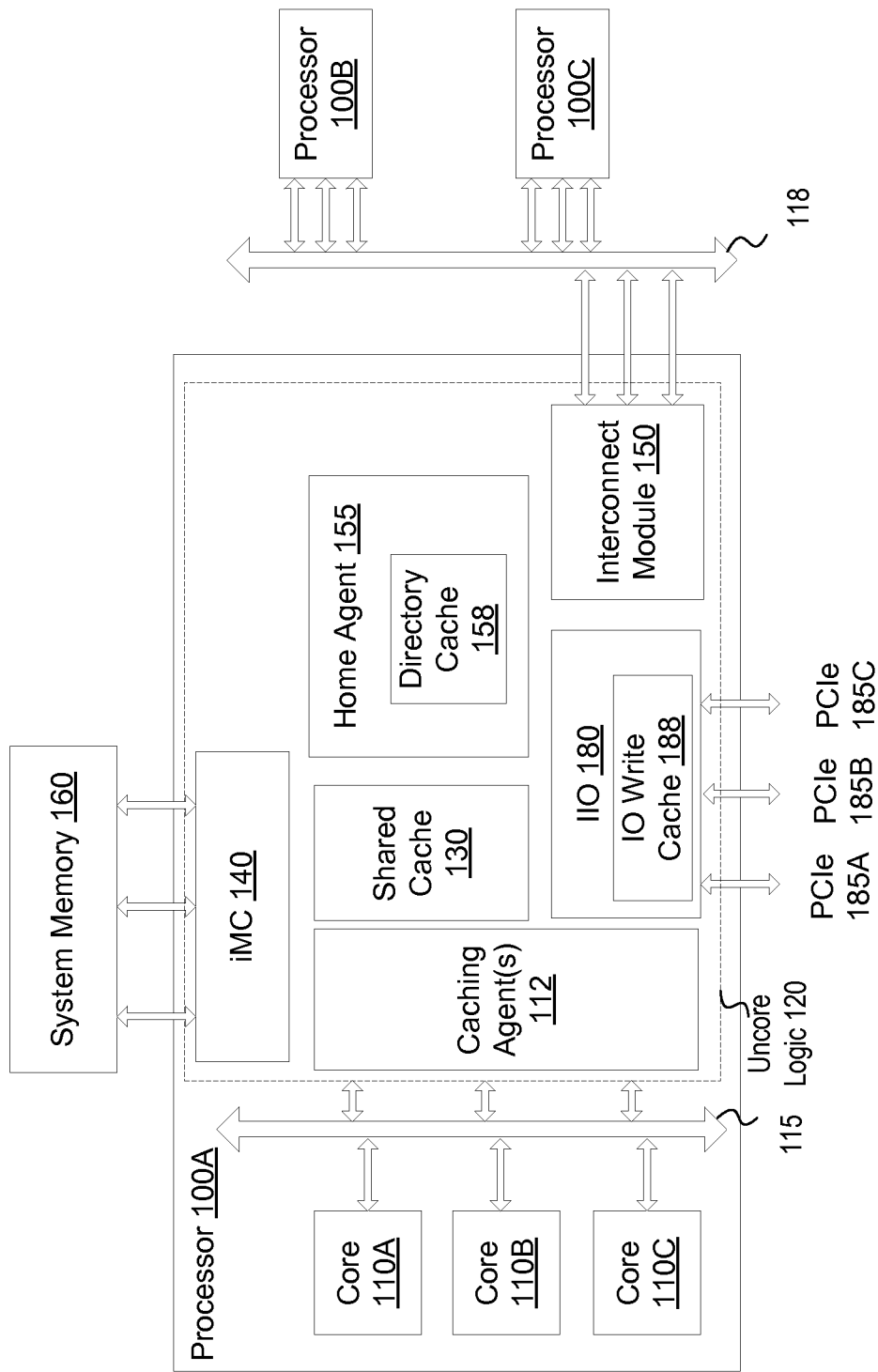
FIG. 1 is a high level block diagram of a processor in accordance with an embodiment of the present invention.

In various embodiments, a directory cache such as an input/output directory cache (IODC) may be provided within a processor (also referred to as a socket or processor socket) to limit the amount of memory traffic that is produced to maintain coherency in a multi-processor system. While the scope of the present invention is not limited in this regard, this directory cache may be stored in a so-called uncore logic of a processor. By providing this directory cache, embodiments may avoid transactions to a memory in which a mil version of the directory is stored. More specifically, embodiments may be used to prevent transmission of a memory request or cache coherence message to a memory including a directory.

As will be described further below, entries may be stored in a directory cache responsive to particular transactions being received from a remote processor (e.g., via an interconnect). These transactions may be those that seek ownership of a requested cache line by a remote caching agent of the remote processor. The remote caching agent may request the ownership of the cache line on behalf of an input/output (I/O) device. Responsive to such a transaction, an entry may be established in the directory cache, which may be a content addressable memory (CAM) structure that is searchable on full memory addresses. Received transactions may include a separate ownership request for a particular cache line and a subsequent writeback command for that cache line. An entry may be added to the directory cache responsive to the ownership request. When the writeback request is received, a particular memory address identified in the writeback request may be used to search the directory cache. Once the entry that was originally added responsive to the ownership request for that memory address is identified, the writeback request may be associated with the ownership request. The entry in the directory cache may then be removed, and data may be written to memory. Accordingly, on an original memory read, a speculative read and/or a directory write that would otherwise be performed with a memory read can be avoided.

In one embodiment the directory cache is used to record remote I/O writes such as remote PCI writes. A PCI write is a request by a peripheral component interconnect (PCI) I/O device to write to memory. A remote PCI write is a PCI write originating at a first processor that is associated with a cache line managed by a second processor. A remote PCI write includes an ownership request for a cache line and a subsequent writeback command for that cache line. The directory cache having the CAM structure may be used to manage such remote PCI writes for embodiments in which the ownership request and the writeback command are not handled atomically. Additionally, the processor interlacing with the I/O device may include an input/output controller that maintains an input/output (IO) write cache, and that marks cache lines in the IO write cache that are managed by a remote processor. Moreover, the processor may include a caching agent that uses first instructions to handle transactions for cache lines managed by remote processors and second instructions to handle transactions tor cache lines managed by a processor on which the caching agent resides.

Embodiments described herein provide a directory cache that is operable in systems wherein the ownership request and writeback components of a PCI write (PCIWr) operation or other I/O write operation are handled non-atomically. The PCIWr operation may be handled atomically in the macro-architecture of the processors (e.g., the transactions are atomic from the perspective of the I/O devices issuing the PCIWr operations), but may be handled non-atomically at the micro-architecture level. Such a non-atomic implementation of PCIWr operations causes the length of time that cache resources and memory are tied up to be minimized. For example, such non-atomic implementations enable a later processor to request and receive ownership to a cache line that has already been granted to an earlier processor before that earlier processor begins writing to the cache line.

PCI write operations may be used to bring blocks of data from disk (e.g., from hard disk drives or other secondary storage) into memory. Specifically, when data is to be read from a disk into memory, a stream of PCI write operations may be performed. In multi-processor systems, such streams of PCI writes may be remote PCI writes that originate from a first processor socket and are associated with cache lines managed by a second processor socket. Accordingly, optimizations associated with PCI writes are desirable. The directory cache, home agent, IIO and caching agents described in implementations may enable cache coherency protocols to be performed for PCI writes with minimum overhead.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present invention. It will be apparent, however, to one skilled in the art that these specific details need not be employed to practice the present invention. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present invention.

Although the following embodiments are described with reference to a processor, other embodiments are applicable to other types of integrated circuits and logic devices. Similar techniques and teachings of embodiments of the present invention can be applied to other types of circuits or semiconductor devices that can benefit from higher pipeline throughput and improved performance. The teachings of embodiments of the present invention are applicable to any processor or machine that performs data manipulations. However, the present invention is not limited to processors or machines that perform 512 bit, 256 bit, 128 bit, 64 bit, 32 bit, or 16 bit data operations and can be applied to any processor and machine in which manipulation or management of data is performed. In addition, the following description provides examples, and the accompanying drawings show various examples for the purposes of illustration. However, these examples should not be construed in a limiting sense as they are merely intended to provide examples of embodiments of the present invention rather than to provide an exhaustive list of all possible implementations of embodiments of the present invention.

Although the below examples describe instruction handling and distribution in the contest of execution units and logic circuits, other embodiments of the present invention can be accomplished by way of a data or instructions stored on a machine-readable, tangible medium, which when performed by a machine cause the machine to perform functions consistent with at least one embodiment of the invention. In one embodiment, functions associated with embodiments of the present invention are embodied in machine-executable instructions. The instructions can be used to cause a general-purpose or special-purpose processor that is programmed with the instructions to perform the steps of the present invention. Embodiments of the present invention may be provided as a computer program product or software which may include a machine or computer-readable medium having stored thereon instructions which may be used to program a computer (or other electronic devices) to perform one or more operations according to embodiments of the present invention. Alternatively, steps of embodiments of the present invention might be performed by specific hardware components that contain fixed-function logic for performing the steps, or by any combination of programmed computer components and fixed-function hardware components.

Referring now to FIG. 1, shown is a high level block diagram of a processor 100A (also referred to as a socket or processor socket) in accordance with an embodiment of the present invention. As shown in FIG. 1, processor 100A may be a multicore processor including multiple cores. 110A-110C. These cores may be physical processors, and may include various components such as front end units, execution units and back end units.

The various cores may be coupled via an interconnect 115 to an uncore logic 120. The uncore logic 120 is logic of the processor 110A outside of the cores that includes various components. Uncore logic 120 may include a shared cache 130 which may be a last level cache. In addition, the uncore logic 120 may include an integrated memory controller (iMC) 140, a home agent (HA) 155, one or more caching agents (referred to as Cbos) 112, an integrated input/output cluster (IIO) 180, and an interconnect module 150 that connects the processor 100A to other processors 100B, 100C via an interconnection 118.

One or more caching agents 112 (Cbos) manage the interface 115 between the cores 110A-C and the shared cache 130. Thus, caching agents 112 write data to and read data from cache lines in shared cache 130. The caching agents 112 are responsible for managing data delivery between the cores 110A-C and the shared cache 112. The caching agents 112 are also responsible for maintaining cache coherency between the cores 110A-C within a single socket (e.g., within processor 100A). This may include generating snoops and collecting snoop responses from cores 110A-C in accordance with a cache coherence protocol such as MESI, MOSI, MOESI, or MESIF. The uncore logic 120 may include multiple caching agents 112 (e.g., 8 caching agents in one embodiment), each assigned to manage a distinct subset of the shared cache.

The caching agents 112 may act as a proxy between the IIO 180 and the interconnect module 150, which in one embodiment is a QuickPath interconnect (QPT). Thus, the caching agents 112 perform a gate keeper function for all messages that originate from the IIO 180 and that are to be transmitted to remote sockets (e.g., processors 100B-C). Similarly, the caching agents 112 may act as a proxy for messages originating in the remote sockets and associated with a cache line that is owned by an I/O device that IIO 180 communicates with.

Integrated input/output cluster (IIO) ISO is an I/O controller that is included in processor 100A. In alternative embodiments an external input/output controller (e.g., an I/O controller hub, which may be a component of a southbridge integrated circuit) may be used rather than IIO 180. IIO 180 (or other I/O controller) connects to and controls I/O devices. For example, IIO 180 may connect to I/O devices via PCI, PCI express (PCIe), PCI extended (PCI-X), or other buses 185A-C. The I/O devices may be, for example, network adapters, graphics cards, audio cards, SCSI controllers, cluster interconnects, hard drive controllers, disk drives, and so forth.

The IIO may receive I/O writes (e.g., PCIe writes) from I/O devices connected to the IIO. The I/O write may be an allocating PCI write or a non-allocating PCI write, for example.

The flow for an allocating write and the flow for a non-allocating write may both begin with an initial InvItoE or RdInvOwn, but differ in the way that the subsequent writeback is performed. The PCI write flow (or other I/O write flow) generally begins with a request for ownership of a cache line from the caching agent attempting to perform the write. Since the originating I/O device typically has no intention of reading the cache line's preexisting data, this flow may not include a read of the data at the cache line. Accordingly, the InvItoE command may be issued to the managing home agent of the cache line to obtain ownership of the line without obtaining data in the line. Alternatively, a read invalidate own (RdInvOwn) command may be issued in the case that the I/O device is to read existing data from the cache line. The InvItoE or RdInvOwn command may be followed by a write of new data to the cache line (a writeback). For the non-allocating flow, the I/O write is sent to the home agent in the form of a WbMtoI command because recently written data will not be cached in that socket's shared cache. For the allocating flow, the data is first cached in the shared cache, and the entry is updated in the I/O write cache to have a modified (M) state, and then subsequently sent to the home agent via a WbMtoE command. The WbMtoI command is a command to write a cache line in a modified state back to memory, and transition its state in the issuing caching agent to invalid (I). The WbMtoE command is a command to write a cache line in an M state back to memory, and transition its state to exclusive (E).

In one embodiment, the caching agent 112 issues a first ownership request for cache lines managed by local home agent 155. However, caching agent 112 may issue a second ownership request for cache lines managed by home agents of remote sockets. An ownership request is a request for exclusive access to a cache line. The first ownership request may be an invalidate to exclusive (E) state (InvItoE) message that causes a receiving home agent to provide exclusive ownership of a cache line without data. The second ownership request may be a modified InvItoE message that includes an additional indicator that identifies the request as having originated from an I/O agent (e.g., an I/O controller) of a different socket (referred to as a hinted InvItoE request). The indicator may be an extra bit that, if set, indicates that the ownership request is for a remotely managed cache line.

The caching agent 112 may additionally be configured to issue an ownership acknowledgement message to the IIO 180 (referred to as a GO-E message) responsive to receiving a message from the home agent granting ownership of a cache line. In contrast, if the cache line is managed by a remote home agent (of a remote socket), the caching agent 112 issues a modified ownership acknowledgement message to the IIO 180 that includes an indicator that the remote home agent manages the cache line for which ownership was received. The modified ownership acknowledgement message, which is issued if a hinted InvItoE message was sent to the remote home agent, is referred to herein as a GO-G message.

Home agent 155 controls coherent access to, and otherwise manages, a subset of a system memory 160. Home agents are responsible for ensuring that a most recent version of data is returned to a requestor either from memory or a cache. The home agents are also responsible for invalidating cache lines associated with caching agents responsive to requests for exclusive access to the data. For example, home agent 155 may perform various processing for requests directed to a portion of system memory 160 coupled to processors 100A-C. This region of system memory (e.g., a range of memory addresses and/or cache lines) may, for example, correspond to one or more dual in-line memory modules (DIMMs). More specifically, home agent 155 may receive incoming requests that are directed to this region of memory and, via logic present in the home agent 155, resolve conflicts and maintain ordering of transactions among other operations. Accordingly, home agent 155 may include logic to receive requests from various components or agents (e.g., caching agents 112 from any of processors 100A-C) and route these requests as appropriate to the corresponding region of memory via integrated memory controller (iMC) 140 (or through an external memory controller). Integrated memory controller 140 is the interface between system memory (e.g., DRAM) 160 and the home agent 155. Accordingly, integrated memory controller 140 translates read and write commands into specific memory commands and schedules them with respect to memory timing.

Note that each processor 100A, 100B, 100C may include its own home agent, and each home agent may be responsible for managing a different region of shared memory 160. Each processor 100A, 100B, 100C may additionally be a multi-core processor that includes an uncore logic such as uncore logic 120. Accordingly, each processor 100A-100C may be connected to different I/O devices, and may manage a different region of system memory 160. The home agents of the processors 100A-C may use a cache coherency protocol such as MESIF, MESI, etc. to maintain coherent caches of system memory 160.

To perform its operations, the home agent 155 may receive information from a directory present in the system memory 160 that indicates the location and states of data in various caching agents of the system. In accordance with various embodiments, home agent 155 may include a directory cache 158, which may provide for storage of directory information corresponding to at least parts of the data stored in the corresponding system memory region managed by home agent 155. Different amounts and types of information may be stored in directory cache 158 in different embodiments. For example, in a most basic implementation, only an address (or a portion of an address) corresponding to a cache line request may be stored within the directory cache. In another embodiment, in addition to address information, additional data such as state information of the corresponding cache line and/or an owner of the cache line may also be stored in the directory cache 158. Yet in further embodiments, a copy of the data present in the cache line may also be stored.

While not limited in this regard, in some implementations directory cache 158 may be configured to store entries for cache lines that are managed by home agent 155. Entries may be added to the directory cache for cache lines owned by remote caching agent on behalf of a remote input/output device. In such embodiments, the directory cache 158 may be referred to as an I/O directory cache (IODC), as it is to store information for cache lines owned by one or more I/O devices coupled to IIO 180 or IIOs of other sockets. In one embodiment, the IODC is used to store entries for cache lines that are allocated to I/O devices associated with remote sockets, but is not used to store entries for cache lines that are allocated to I/O devices interfaced by local IIO 180 or allocated to local cores or cores of remote sockets.

Home agent 155 may add entries to the directory cache 158 when an ownership request for a cache line is received from a remote caching agent. Thus, the directory cache may hold a latest directory state of the cache line, while a directory state of the cache line in system memory may be stale. The ownership request may have been triggered in response to an IIO of a remote socket receiving a PCI write request or other I/O write request from an I/O device. The home agent 155 or caching agent may generate a request transaction identifier (RTID) for the ownership request, and the RTID may be included in the entry along with a cache line address. Home agent 155 may also include an identity of the remote socket, an identity of the remote caching agent in the remote socket, and/or an identity of the remote I/O device to which the ownership of the cache line has been granted. In one embodiment, home agent 155 responds to a hinted InvItoE command by generating an entry in the directory cache 158. However, home agent 155 may not add entries to the directory cache 158 for standard InvItoE commands.

The PCI write request may additionally include a writeback command (e.g., a WbMtoE command for an allocating writeback or a WbMtoI command for a non-allocating writeback) for the cache line that ownership was granted for. A writeback command associated with a remote PCI write will reference a cache line address that is included in a directory cache 158. When home agent 155 receives such a writeback command for a cache line, the writeback command may be associated with a distinct RTID. Since the RTID for the writeback command will not match the RTID for the previous ownership request, home agent 155 searches through the directory cache 158 to identify the entry associated with that cache line address. Directory cache 158 may be a content addressable memory (CAM) structure that is searchable on the full address of the cache line to facilitate such searching. Content addressable memory is a type of computer memory that permits high speed searching operations. A CAM searches its entire memory in a single search operation responsive to receiving a data word (e.g., a cache line address or hash of a cache line address). If the data word is found, the CAM returns a list of one or more storage addresses where the word was found. Thus, a CAM may be a hardware embodiment of an associative array.

The IIO 180 includes an input/output (IO) write cache 188. After the IIO receives a write request from an I/O device (e.g., a PCI write request), IIO 180 may add an entry to the IO write cache 188 for a specific cache line once ownership of the cache line is received. If the write request is associated with a cache line that is managed by a home agent of a remote socket (e.g., processor 100B or 100C), IIO 180 adds an identifier to the entry indicating this fact. The indicator in the entry may indicate that IIO 180 should initiate a specific flow for writing to memory managed by a remote processor when a writeback is to be performed. A different flow may be performed to write to the memory if the memory is managed by processor 100A.

Once the IIO 180 determines to evict a cache line entry from the IO write cache 188, IIO 180 issues a CL_Flush command to the caching agent 112 if a non-allocating write is to be performed and/or if the cache line is managed by local home agent 155. The CL_Flush command causes a modified to invalid (WbMtoI command to be issued. For an allocating write command for a cache line managed by a remote home agent (indicated by an identifier included in the cache line entry of the IO write cache), the IIO issues a CL_Cleanse command to the caching agent 112. The CL_Cleanse command is similar to the CL_Flash, but causes a modified to exclusive (WbMtoE) command to be generated by the caching agent 112.

Figure 2A:
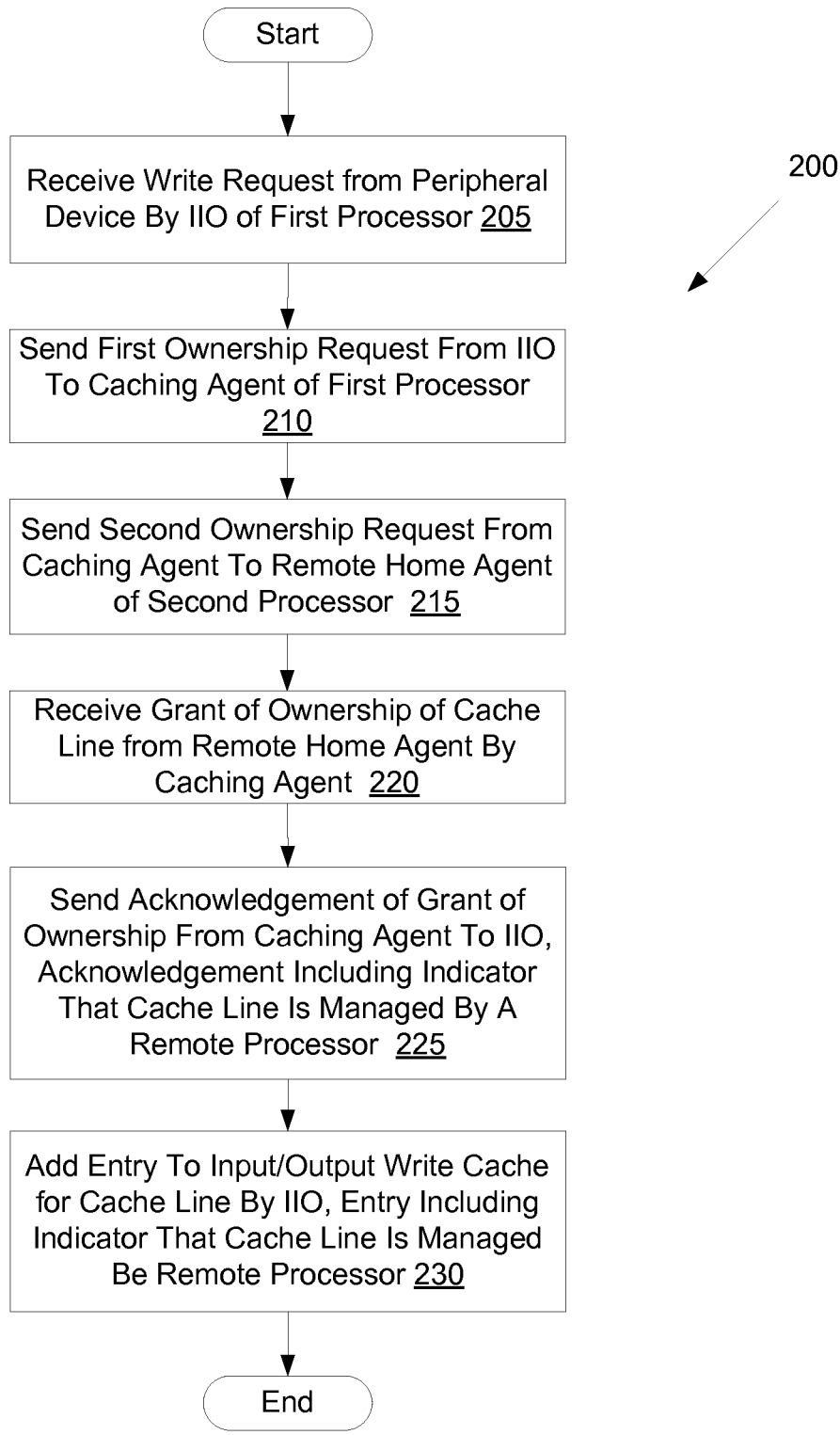
FIG. 2A is a flow diagram of a method for issuing an ownership request for a cache line to a remote home agent in accordance with one embodiment of the present invention.

FIG. 2A is a flow diagram of a method 200 for issuing an ownership request for a cache line to a remote home agent in accordance with one embodiment of the present invention. Method 200 may be implemented by processing logic of a processor, such as by components of an uncore logic in a processor. In one embodiment, various operations of method 200 are performed by an IIO and/or a caching agent of a multi-core processor.

At block 205 of method 200, an IIO of a first processor (or an external I/O hub associated with the first processor) receives a write request from an I/O device. The write request may be a PCI write request for a cache line. At block 210, the IIO sends a first ownership request to a caching agent of the first processor.

The caching agent of the first processor determines that the requested cache line is managed by a remote home agent of a remote processor (e.g., of a remote socket). Accordingly, at block 215 the caching agent sends a second ownership request to the home agent of the second processor. The second ownership request may be a hinted InvItoE message. The caching agent may send the second ownership request to an interconnect module (e.g., to a QuickPath Interconnect (QPI) module), which may propagate the message to the remote processor.

At block 220, the caching agent receives a grant of ownership of the cache line from the remote home agent (e.g., a Gnt_CMP message). At block 225, the caching agent sends an acknowledgement of the grant of ownership to the IIO. The acknowledgement of ownership may include an indicator that the cache line is managed by the remote home agent of the remote processor. In one embodiment, the acknowledgement message is a GO-G message, At block 230, the IIO adds an entry for the cache line to an IO write cache maintained by the IIO. The entry may include an indicator that the cache line is managed by the remote home agent of the remote processor. The indicator may cause the IIO to issue a CL-Cleanse command rather than a CL_Flush command when evicting the cache line from the IO write cache for an allocating write. For non-allocating writes, the IIO may issue a CL_Flush command.

Figure 2B:
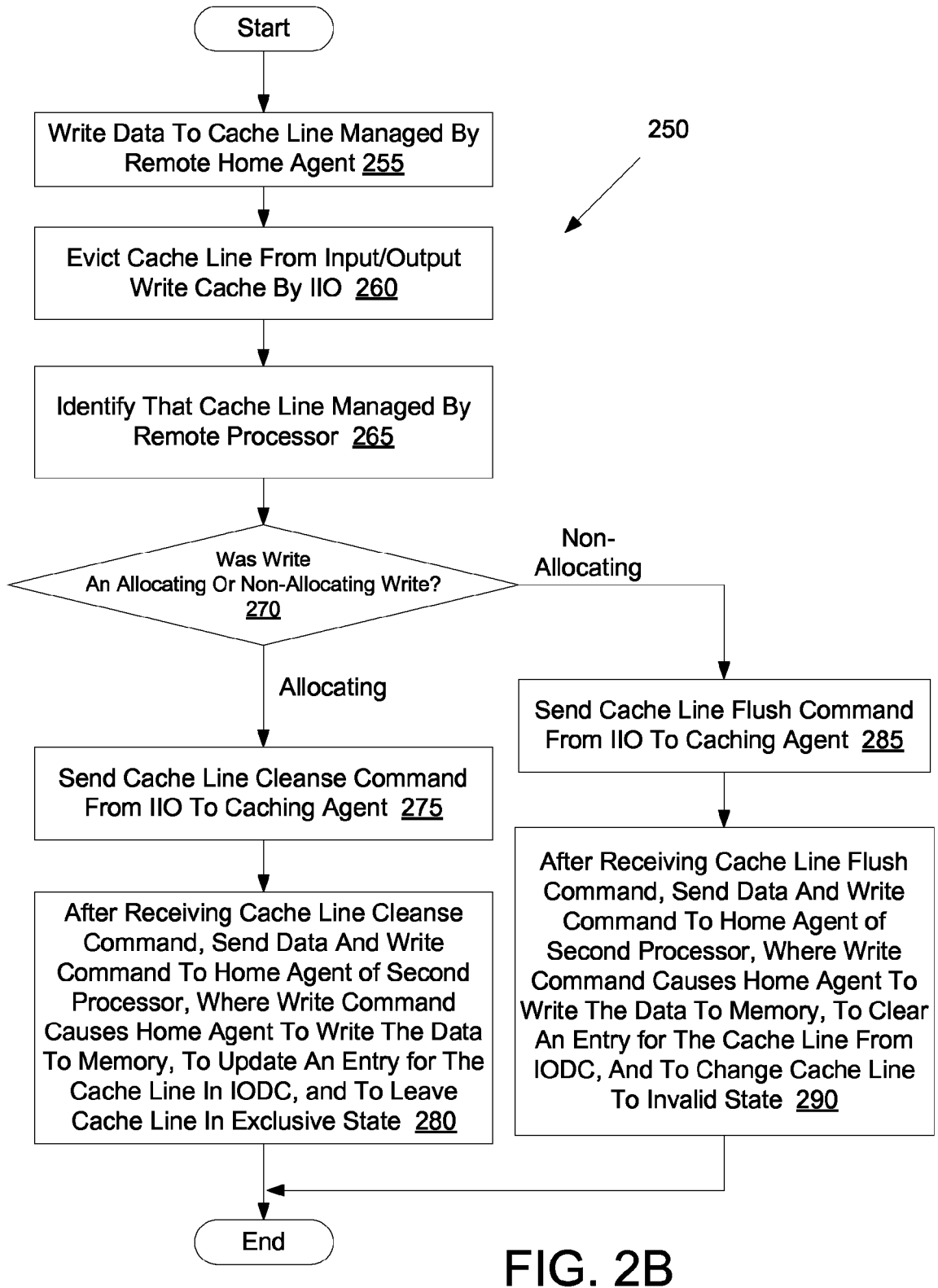
FIG. 2B is a flow diagram of a method for performing a writeback operation in accordance with an embodiment of the present invention.

FIG. 2B is a flow diagram of a method 250 for performing a writeback operation in accordance with an embodiment of the present invention. Method 250 may be implemented by processing logic of a processor, such as by components of an uncore logic in a processor. In one embodiment, various operations of method 250 are performed by an IIO and/or a caching agent of a multi-core processor.

At block 255, processing logic writes data to a cache line managed by a remote home agent on behalf of an I/O device. This may cause the cache line to transition from an exclusive (E) state to a modified (M) state. Ownership of the cache line may have been granted to a local I/O device that interfaces with a local IIO. At block 260, the local IIO evicts an entry for the cache line in the M state from an input/output write cache. Evicting the entry may trigger a writeback to memory. At block 265, the IIO determines that the cache line is managed by the remote home agent based on the presence of an indicator in the entry for the cache line in the IO write cache. The indicator may be a bit that, when set, indicates that the cache line is managed by a remote home agent. At block 270, the IIO determines whether the write to the cache line is an allocating write or a non-allocating write. If the write is an allocating write, the method continues to block 275, If the write is a non-allocating write, the method proceeds to block 285.

At block 275, the IIO sends a cache line cleanse command to the caching agent. The cache line cleanse (CL_Cleanse) command will result in a hit on the last level cache by the caching agent, which will cause the caching agent to issue a snoop invalidate message (SnpInv) to the IIO. Responsive to receiving the SnpInv message from the caching agent, the IIO will send a RspIFwdM message and an accompanying data message (C2Udata) to the caching agent. The RspIFwdM message indicates that the cache line is left in the invalid (I) state in the I/O write cache, and that the data in the accompanying data message is to be written to memory. Responsive to receiving these messages, at block 280 the caching agent sends a WbMtoE message and an accompanying data message (WbEData) to the remote home agent. These messages may cause the remote home agent to write the data in the data message to an appropriate address of memory, and to leave the cache line hi an exclusive state. The remote home agent may additionally update or deallocate an entry for the cache line in a directory cache. Once the write is complete, the caching agent may receive a write confirmation (e.g., a Cmp) message from the home agent, and may send an acknowledgement message (e.g., a GO-I message) to the IIO.

At block 285, the IIO sends a cache line flush command to the caching agent. The cache line flush (CL_Flush) command will result in a hit on the last level cache by the caching agent, which will cause the caching agent to issue a snoop invalidate message (SnpInv) to the IIO. Responsive to receiving the SnpInv message from the caching agent, the IIO will send a RspIFwdM message and a data message to the caching agent. The RspIFwdM message indicates that the cache line is left in the invalid (I) state in the I/O write cache, and that the data in the accompanying data message is to be written to memory. Responsive to receiving these messages, at block 290 the caching agent sends a WbMtoI message and an accompanying data message to the remote home agent These messages may cause the remote home agent to write the data in the data message to an appropriate address of memory, and to change the cache line to an invalid state. Additionally, the remote home agent may remove an entry for the cache line from a directory cache. Once the write is complete, the caching agent may receive a write confirmation (e.g., a Cmp) message from the home agent, and may send a GO-I acknowledgement message to the IIO.

Figure 3A:
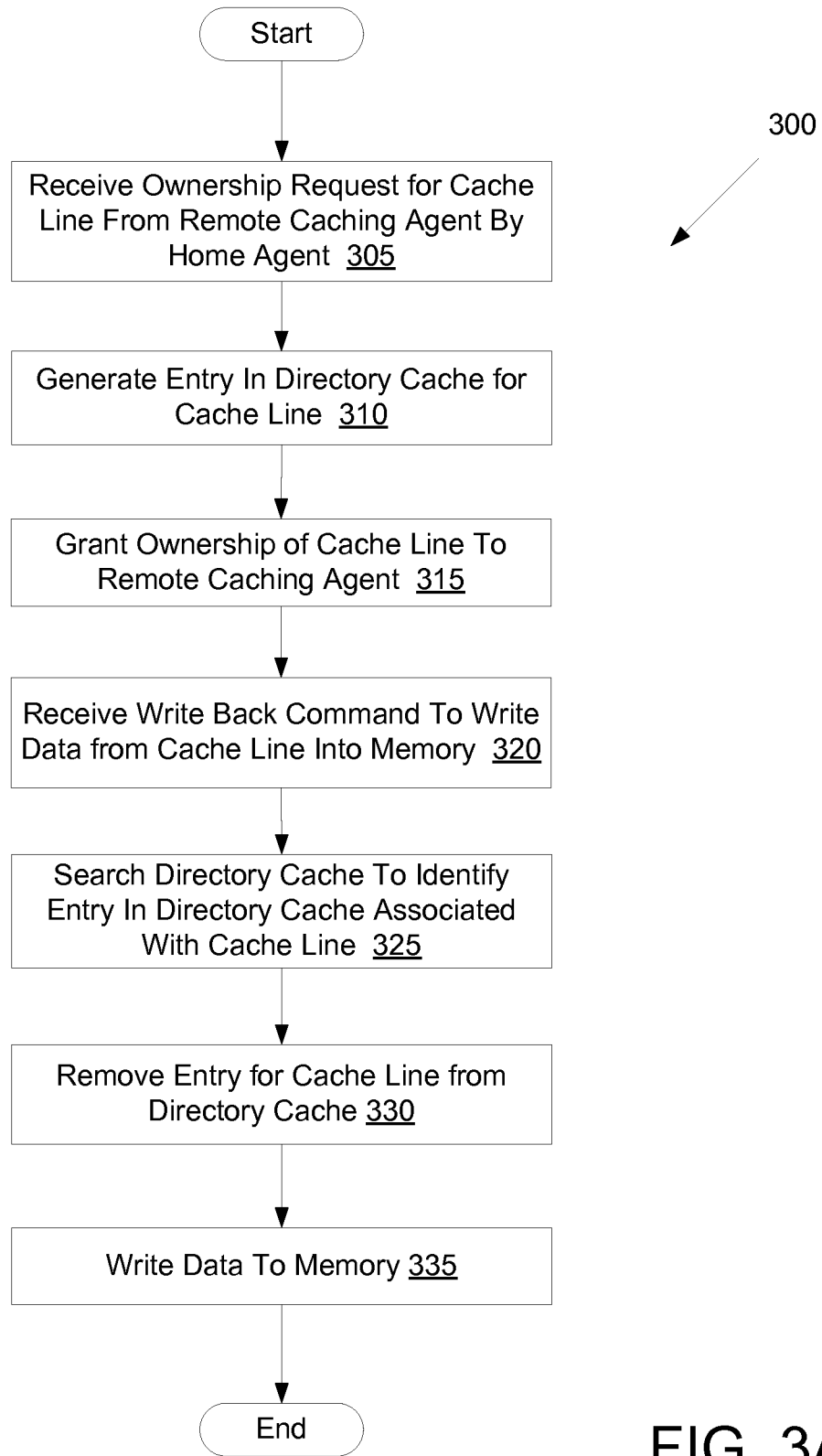
FIG. 3A is a flow diagram of a method for granting ownership of a cache line by a home agent in accordance with an embodiment of the present invention.

FIG. 3A is a flow diagram of a method 300 for granting ownership of a cache line by a home agent in accordance with an embodiment of the present invention. Method 300 may be implemented by processing logic of a processor, such as by components of an uncore logic in a processor. In one embodiment, various operations of method 300 are performed by a home agent of a multi-core processor.

At block 305 of method 300, a home agent receives an ownership request for a cache line from a remote caching agent. The home agent may manage a particular subset of memory, and the cache line may be associated with a memory address in the subset. This request for ownership may be triggered by an I/O write request from an I/O device associated with a remote processor. In one embodiment, this request may be a hinted invalidate-to-exclusive (InvItoE) request.

At block 310, on receipt of the ownership request, the home agent may update its internal directory cache and also forward the request to memory. The updating of the internal directory cache may be by allocating an entry in the directory cache for this cache line and setting a state of the entry for the cache line. On allocation of an entry for a new transaction, the state of the entry may be set to represent ownership of this address by the I/O device and/or the caching agent acting as a proxy for the I/O device.

At block 315, the home agent grants ownership of the cache line to the remote caching agent and/or to the I/O device that originated the request. In addition, the home agent may send a grant message back to the caching agent for forwarding on to the IIO of the remote processor and ultimately to the I/O device to indicate it now has ownership of the requested cache line. Thus, at this point the state identifying ownership of the data at this cache line by the I/O device is coherent among all of the sockets (processors) of a computing device.

At block 320, the home agent receives a writeback command to write data from the cache line into memory. The writeback command may be a WbMtoE message or a WbMtoI message, and may be accompanied by a separate data message. At block 325, the home agent searches the directory cache to identity an entry in the directory cache associated with the cache line. The directory cache may be a CAM that is searchable on the full addresses of cache lines.

At block 330, after identifying an entry in the directory cache for the cache line, the home agent clears or updates the entry for the cache line in the directory cache. At block 335, the home agent writes the data associated with the writeback command into memory. The home agent then sends a completion acknowledgment to the remote caching agent.

Figure 3B:
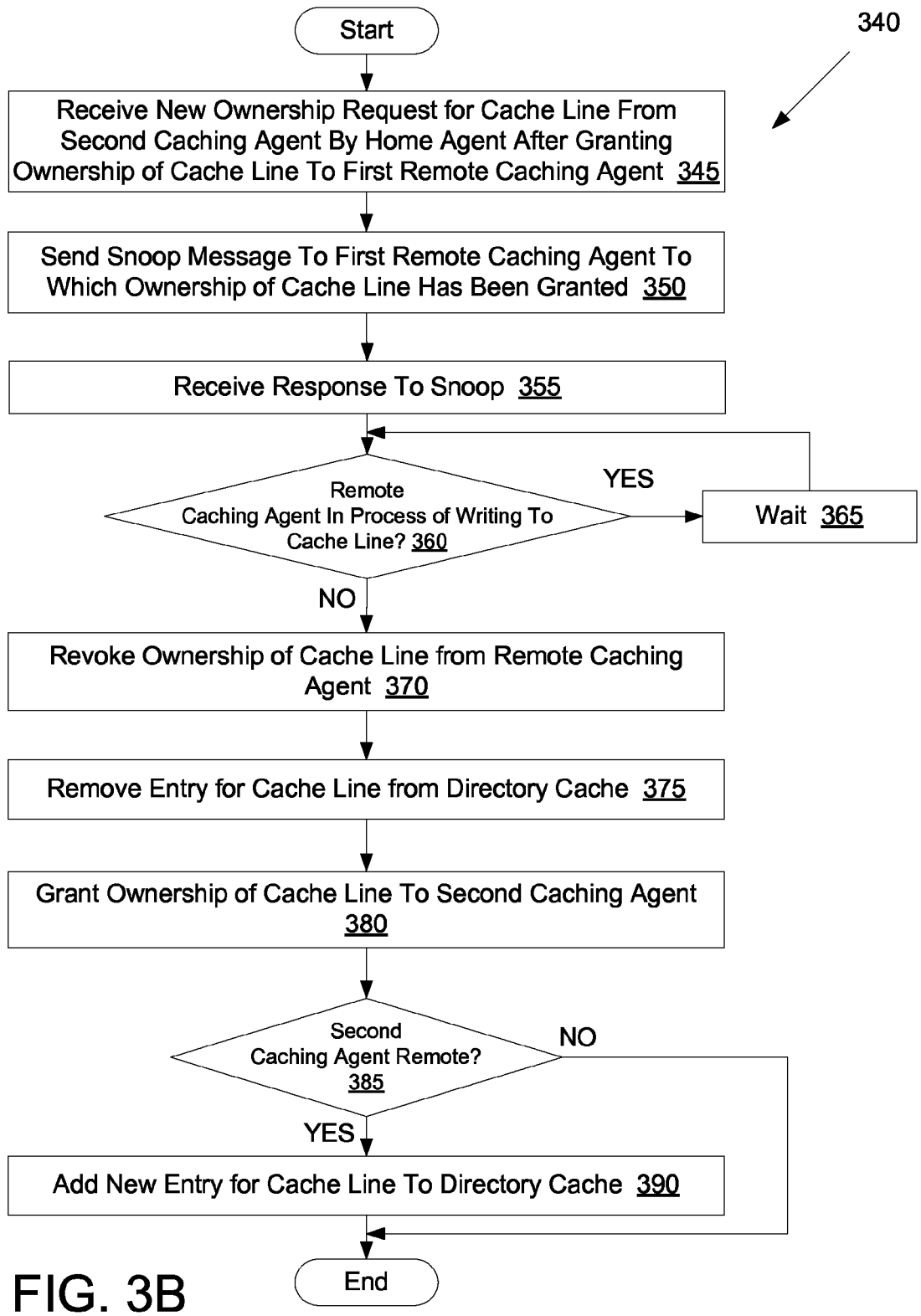
FIG. 3B is a flow diagram of a method for revoking and re-granting ownership of a cache tine in accordance with an embodiment of the present invention.

FIG. 3B is a flow diagram of a method 340 for revoking and re-granting ownership of a cache line in accordance with an embodiment of the present invention. Method 340 may be implemented by processing logic of a processor, such as by components of an uncore logic in a processor. In one embodiment, various operations of method 340 are performed by a home agent of a multi-core processor.

After granting ownership of a cache line to a remote I/O device, a home agent may receive an intervening request for ownership of the cache line from a local caching agent or a remote caching agent. The request may originate from a local I/O device, a remote I/O device, a local core or a core of a remote processor. At block 345, the home agent receives a request for ownership for a cache line for which exclusive ownership has already been granted to a remote caching agent for an I/O device. This request may be in the form of an InvItoE request, and may be received from a second caching agent, which may be a local or remote caching agent.

Responsive to receipt of this request, it may be determined whether a hit occurs in the internal directory cache of the home agent. Responsive to a hit on the directory cache, at block 350 the home agent sends a snoop message to a caching agent to which ownership of the cache line has been granted. At block 355, the home agent receives a response to the snoop request from the remote caching agent.

The snoop response will indicate whether the remote caching agent is in the process of writing to the cache line. At block 360, processing logic determines whether the caching agent is in the process of writing to the cache line (e.g., whether a writeback is in flight). If the remote caching agent is in the process of writing to the cache line, it would be inefficient to revoke the grant of ownership for the cache line from the remote caching agent. Accordingly, the method proceeds to block 365, and the home agent waits for the remote caching agent to complete writing to the cache line and for a writeback to complete. Alternatively, the second caching agent may have to issue a new ownership request for the cache line. If the remote caching agent is not in the process of writing to the cache line, the method continues to block 370.

At block 370, the home agent revokes ownership of the cache line from the remote caching agent. Additionally, the home agent may transmit an invalidation message to the remote caching agent to cause the cache line to be invalidated in the remote caching agent. Accordingly, the remote caching agent may need to reacquire ownership of the cache line to use it. At block 375, the home agent removes an entry for the cache line from the directory cache. At block 380, the home agent grants ownership of the cache line to the second caching agent.

At block 385, the home agent determines whether the second caching agent is a remote agent. This determination may be made based on the ownership request that was received. If the ownership request was a standard InvItoE request, then it will have been received from a local caching agent. If the ownership request was a hinted InvItoE request, then it will have been received from a remote caching agent. If the ownership request was received from a remote caching agent, the home agent adds a new entry for the cache line to the directory cache at block 390.

Figure 4:
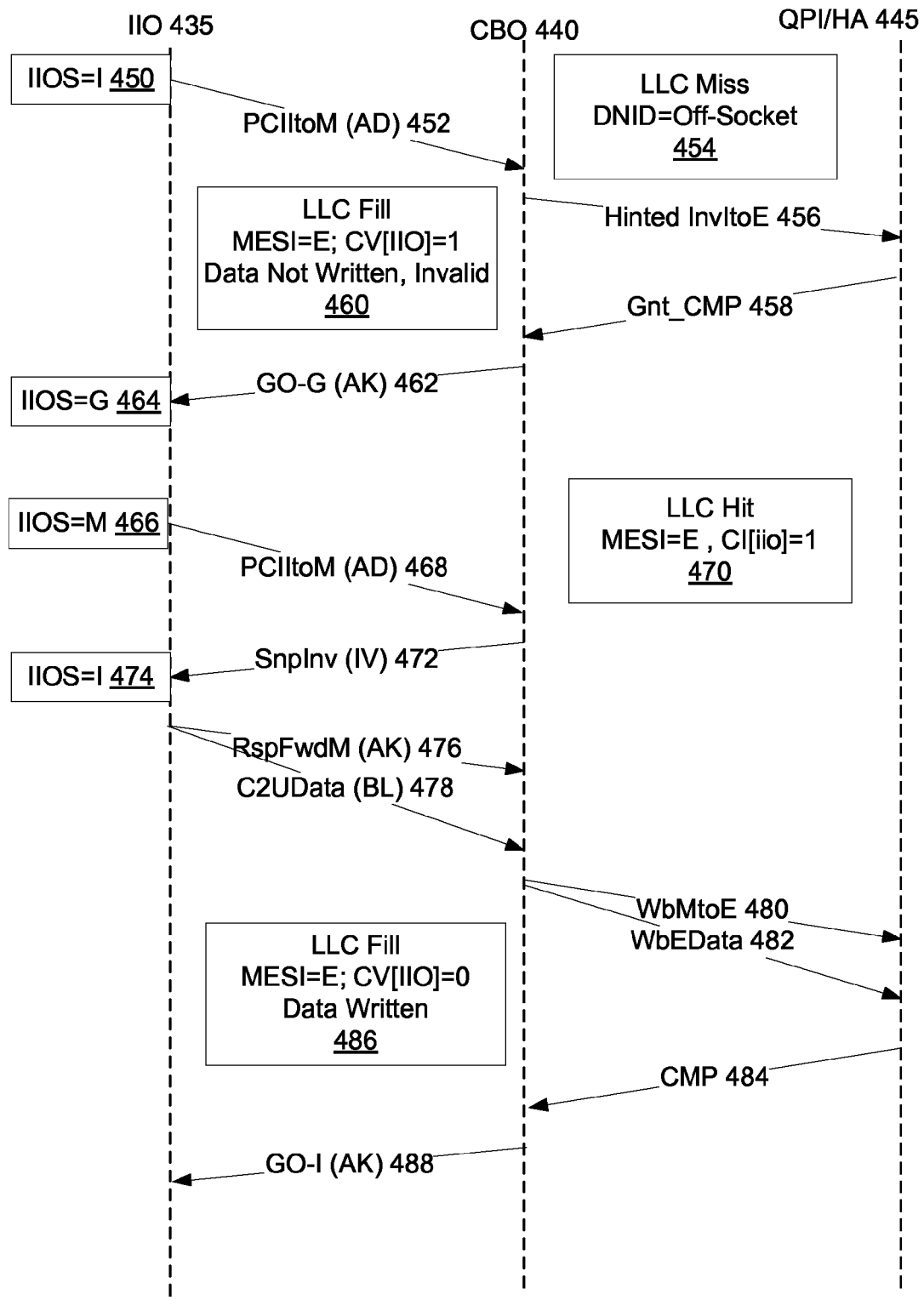
FIG. 4 is a timing diagram of cache coherency operations in accordance with an embodiment of the present invention.

FIG. 4 is a timing diagram of cache coherency operations in accordance with an embodiment of the present invention. As shown in FIG. 4, various transactions are initiated and handled by different agents of a system. Assume for purposes of discussion that the system of FIG. 4 is a multi-socket system. Each socket may have an uncore with its own home agent, caching agent (or agents), integrated input/output controller (IIO) and core or cores. The system may further include at least one I/O device coupled to a socket via IIO 435 of the socket. The socket additionally includes a caching agent (Cbo) 440 that acts as a proxy between the IIO 435 and a home agent 445 of a remote socket. Messages are exchanged with the home agent 445 via an interconnect module such as a QPI module.

The I/O device may seek ownership of a cache line associated with a memory address. At the time that ownership is sought, the IIO may have an invalid (I) state for the cache line (block 450). Responsive to the ownership request, the IIO 435 sends a PCIItoM message to the caching agent 440. The caching agent 440 does a lookup on the address, which results in a miss of the socket's last level cache (LLC) and a determination that the address is managed by remote home agent 445 of a remote socket (block 454). Accordingly, the caching agent 440 issues a hinted InvItoE request 456 to the remote home agent 445. The remote home agent then grants ownership to the Cbo 440 and issues a grant completion (Gnt_CMP) message 458 back to the caching agent 440. In response, the caching agent 440 sends an acknowledgement of the grant of ownership for the address 462 to the IIO 435. The acknowledgement message may be a GO-G message that includes an indicator that the address is managed by a remote home agent. The IIO adds an entry to an IO write cache for the address. The entry may indicate that the I/O device has exclusive access to the ache line, and may include and indicator indicating the fact that the address is managed by remote home agent 445.

Subsequent to receiving the grant of ownership, a caching agent may write data to a cache line associated with the memory address for the I/O device, and the IIO may update a state of the IO write cache for the address to modified (M) (block 466). In the micro-architecture this may be a separate transaction than the previous grant of ownership transaction, and so may be handled non-atomically. However, in the macro-architecture, the two transactions may be considered a single atomic transaction. At some time after the cache line has been written to, the IIO may decide to evict the cache line. This may trigger either an allocating writeback command or a non-allocating writeback command.

At block 468, the IIO issues a PCIItoM command 468 to the caching agent 440. This results in a hit on the LLC (block 470). Responsive to the hit on the LLC, the caching agent 440 issues a snoop invalidate (SnpInv) message 472 to the IIO 435. The SnpInv message is a snoop message that inquires about a particular cache line, and invalidates that cache line where it is found. The IIO 435 then transitions a state of the cache line to invalid (I), and issues two messages to the caching agent 440. These messages include a RspIFwdM message 476 and a C2UData message 478. The caching agent 440 then issues a WbMtoE message 480 (for an allocating write) and a WbEData message 482 to the remote home agent 445. If a non-allocating write is to be performed, the caching agent 440 would issue a WbMtoI message. These messages cause the home agent to write the data to the address of memory associated with the cache line. When this is done, the remote home agent 445 sends a completion (CMP) response 484 to the caching agent 440. The caching agent 440 in turn issues an acknowledgement message to the IIO (e.g., a GO-I message) 488.

Figure 5:
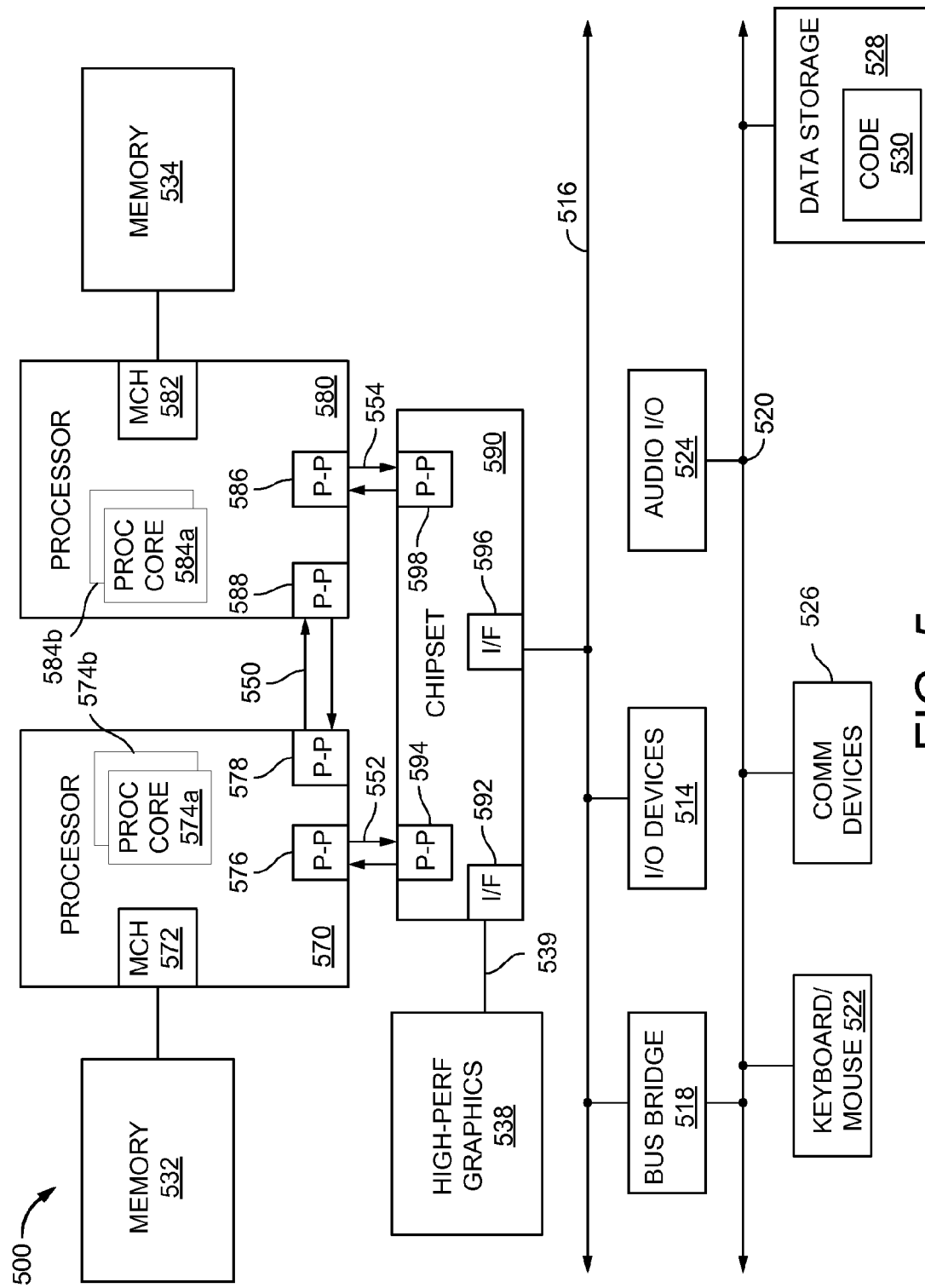
FIG. 5 is a block diagram of a system in accordance with an embodiment of the present invention.

Embodiments may be implemented in many different system types. Referring now to FIG. 5, shown is a block diagram of a system in accordance with an embodiment of the present invention. As shown in FIG. 5, multiprocessor system 500 is a point-to-point interconnect system, and includes a first processor 570 and a second processor 580 coupled via a point-to-point interconnect 550. As shown in FIG. 5, each of processors 570 and 580 may be multicore processors, including first and second processor cores (i.e., processor cores 574*a* and 574*b* and processor cores 584*a* and 584*b*), although potentially many more cores may be present in the processors. The processors each may include directory caches in accordance with an embodiment of the present invention to reduce the amount of memory transactions used for maintaining coherency. For example, the directory caches can store information regarding portions of memory owned by devices coupled to a chipset 590 coupled to the processors.

Still referring to FIG. 5, first processor 570 further includes a memory controller hub (MCH) 572 (e.g., an integrated memory controller) and point-to-point (P-P) interfaces 576 and 578. Similarly, second processor 580 includes a MCH 582 and P-P interfaces 586 and 588. MCH's 572 and 582 couple the processors to respective memories, namely a memory 532 and a memory 534, which may be portions of main memory (e.g., a dynamic random access memory (DRAM)) locally attached to the respective processors, and which collectively may maintain a directory. First processor 570 and second processor 580 may be coupled to chipset 590 via P-P interconnects 552 and 554, respectively.

Chipset 590 includes P-P interfaces 594 and 598. Furthermore, chipset 590 includes an interface 592 to couple chipset 590 with a high performance graphics engine 538, by a P-P interconnect 539. In turn, chipset 590 may be coupled to a first bus 516 via an interface 596. Various input/output (I/O) devices 514 (also referred to as I/O devices) may be coupled to first bus 516, along with a bus bridge 518 which couples first bus 516 to a second bus 520. Various devices may be coupled to second bus 520 including, for example, a keyboard/mouse 522, communication devices 526 and a data storage unit 528 such as a disk drive or other mass storage device which may include code 530, in one embodiment. Further, an audio I/O 524 may be coupled to second bus 520.

Embodiments may be implemented in code and may be stored on a storage medium having stored thereon instructions which can be used to program a system to perform the instructions. The storage medium may include, but is not limited to, any type of non-transitory storage medium such as disk including floppy disks, optical disks, hard disks/magnetic disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the an. will appreciate numerous modifications and variations therefrom. It is intended that the appended claims cover all such modifications and variations as fall within the true spirit and scope of this present invention.

What is claimed is:

1. A method comprising:
   responsive to receiving a write request for a cache line from a I/O device, determining, by a caching agent of a first processor, that the cache line is managed by a home agent of a second processor;
   sending an ownership request for the cache line to the second processor; and
   responsive to receiving a grant of ownership for the cache line from the home agent of the second processor, adding an entry for the cache line to an input/output (I/O) write cache by an I/O controller associated with the first processor, the entry comprising a first indicator that the cache line is managed by the home agent of the second processor.

2. The method of claim 1, wherein the ownership request comprises a second indicator that causes the home agent of the second processor to add a record for the cache line to a directory cache.

3. The method of claim 2, further comprising:
   responsive to evicting the entry for the cache line from the input/output write cache:
   making a determination that the entry for the cache line in the input/output write cache includes the first indicator, and
   sending a cache line cleanse command from the I/O controller to the caching agent in response to the determination, wherein the caching agent sends the data and a write command to the home agent of the second processor, and wherein the write command causes the home agent to write the data to memory and to update the record for the cache line from the directory cache.

4. The method of claim 3, wherein the write command is an allocating write command that further causes the home agent to transition a state of the cache line to exclusive.

5. The method of claim 1, further comprising:
   sending acknowledgement of the grant of ownership to the I/O controller by the caching agent, wherein the acknowledgement comprises a third indicator that the cache line is managed by the home agent of the second processor, and wherein the third indicator causes the I/O controller to include the first indicator in the entry.

6. The method of claim 1, further comprising:
   receiving a snoop message from the home agent prior to using the cache line; and
   responding to the snoop message with a reply that the cache line is not in use, wherein the home agent revokes ownership of the cache line from the caching agent responsive to the reply.

7. A processor comprising:
   at least one core; and
   an uncore logic coupled to the at least one core, the uncore logic comprising:
   an input/output (I/O) controller that has an input/output write cache; and
   a caching agent, coupled to the I/O controller, that is to act as a proxy between the I/O controller and a home agent of an additional processor, wherein the I/O controller is to add an entry to the input/output write cache for a cache line responsive to a grant of ownership for the cache line from the additional processor, the entry comprising a first indicator that the cache line is managed by the home agent of the additional processor.

8. The processor of claim 7, wherein:
   the I/O controller is to send a request for the cache line to the caching agent responsive to receiving a write request from an I/O device; and
   the caching agent is to determine that the cache line is managed by the home agent of the second processor and to send an ownership request for the cache line to the home agent of the second processor, the ownership request comprising a second indicator that causes the home agent of the second processor to add a record for the cache line to a directory cache.

9. The processor of claim 8, wherein:
   responsive to evicting the entry for the cache line from the input/output write cache, the I/O controller is to make a determination that the entry for the cache line in the input/output write cache includes the first indicator, and send a cache line cleanse command from the I/O controller to the caching agent in response to the determination; and
   the caching agent is to send data and a write command to the home agent of the second processor, wherein the write command causes the home agent to write the data to memory and to update the record for the cache line in the directory cache.

10. The processor of claim 8, wherein the caching agent is to receive the grant of ownership from the home agent and to send acknowledgement of the grant of ownership to the I/O controller, the acknowledgement comprising a third indicator that the cache line is managed by the home agent of the second processor, and wherein the third indicator causes the I/O controller to include the first indicator in the entry.

11. The processor of claim 7, wherein the caching agent is to
   receive a snoop message from the home agent prior to using the cache line and to respond to the snoop message with a reply that the cache line is not in use, wherein the home agent is to revoke ownership of the cache line from the caching agent responsive to the reply.

12. A system comprising:
   a first processor having a first uncore logic comprising a caching agent that is to act as a proxy between an input/output (I/O) controller associated with the first processor and a home agent of a second processor, wherein the caching agent is to send an ownership request for a cache line to the home agent responsive to the I/O controller receiving a write request from an I/O device, the ownership request comprising a first indicator that will cause the home agent of the second processor to add a record for the cache line to a directory cache;
   the second processor, coupled to the first processor, having a second uncore logic comprising the home agent and the directory cache, wherein the home agent is to generate an entry in the directory cache for the cache line responsive to receiving the ownership request that includes the first indicator, and wherein the home agent is further to grant ownership of the cache line to the caching agent of the first processor;
   wherein the caching agent is to receive the grant of ownership from the home agent and to send acknowledgement of the grant of ownership to the I/O controller, the acknowledgement comprising a second indicator that the cache line is managed by the home agent of the second processor; and
   wherein the I/O controller is to add an entry to an input/output write cache for the cache line responsive to receiving the acknowledgement that includes the second indicator, the entry comprising a third indicator that the cache line is managed by the home agent of the second processor.

13. The system of claim 12, wherein the directory cache is an input/output directory cache comprising a content addressable memory (CAM) structure.

14. The system of claim 12, wherein:
responsive to evicting the entry for the cache line from the input/output write cache, the I/O controller is to make a determination that the entry for the cache line in the input/output write cache includes the first indicator, and send a cache line cleanse command to the caching agent in response to the determination; and
the caching agent is to send data and a write command to the home agent of the second processor, wherein the write command causes the home agent to write the data to memory and to clear the record for the cache line from the directory cache.

15. The system of claim 12, wherein the third indicator comprises a set bit in the entry for the cache line in the input/output write cache.

16. The system of claim 12, wherein:
responsive to receiving a new ownership request for the cache line from a second caching agent, the home agent of the second processor is to send a snoop message to the caching agent of the first processor;
responsive to receiving the snoop message, the caching agent is to send a response to the home agent indicating whether the cache line is being written to; and
the home agent is to revoke ownership of the cache line from the caching agent, remove the record from the directory cache, and grant ownership of the cache line to the second caching agent if the caching agent is not writing to the cache line.

* * * * *